3,097,911
PROCESS OF RESERVING WOOL WITH BIS-TRI-
AZINE DIPHENYLSULFIDE COMPOUNDS
Jan J. A. Moll, Vlaardingen, Netherlands, assignor, by
mesne assignments, to Fabriek van Chemische Producten Vondelingenplaat N.V., Rotterdam, Netherlands
No Drawing. Filed Sept. 23, 1960, Ser. No. 57,882
Claims priority, application Netherlands Oct. 14, 1959
3 Claims. (Cl. 8—65)

There are many known products which are capable of preventing proteins from being dyed or substantive dyes. Often such so-called wool reserving products have an insufficient action for practical purposes and most known products have a bad fastness to light.

It is an object of the present invention to provide new compounds of the type set forth which have, in addition to an excellent reserving action on natural proteins and synthetic polyamides, a very good fastness to light.

A further object of this invention is to provide an improved process of reserving natural proteins and synthetic polyamides against being dyed by substantive dyes.

The compounds of this invention may be represented by the general formula

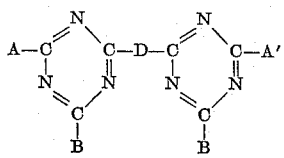

wherein A, A', B and B' are different or not and represent a radical selected from the group comprising —NH$_2$ and an amine radical bonded to the cyanuric group at its nitrogen atom, and D is a diaminodiphenylsulfide radical bonded to the cyanuric groups at its nitrogen atoms.

As most wool reserving products the new compounds of this invention also have a tanning action.

Preferably the diphenylsulfide derivatives used in preparing the new compounds contain sulfonic acid groups in an ortho position with respect to the sulfur bridge. However, a satisfactory solubility of the compounds may also be obtained without sulfonic acid groups in the diphenylsulfide radical if the amine radicals contain sulfonic acid groups or other solubilizing groups.

As will appear from the examples the new compounds may be prepared by condensation reactions in any order. Thus, two moles of cyanuric chloride may be condensed first with two moles of metanilic acid, followed by a condensation with one mole of 4,4'-diaminodiphenylsulfide-2,2'-disulfonic acid whereafter the residual chlorine atom in each of the cyanuric radicals of the product obtained is replaced by reaction with aniline. Alternatively, for example, a condensation of one mole of the diphenylsulfide derivative with two moles of cyanuric chloride may be carried out first, then a condensation with two moles of metanilic acid and finally a condensation with two moles of aniline.

The expression "amine" is used herein in the sense of a compound containing a reactive hydrogen atom bonded to a nitrogen atom and, accordingly, comprises, in addition to aliphatic and aromatic amines, such as mono- and diethanolamine, aniline, 2-methyl-4-sulfoaniline, 3-methyl-5-sulfoaniline, 4-methyl-3-sulfoaniline, 2-methoxy - 4 - sulfoaniline, 4 - methoxy - 3 - sulfoaniline, 2-chloro-5-sulfoaniline and 4-chloro-3-sulfoaniline, and heterocyclic amines, such as morpholine, other compounds containing amino groups such as, for example, metanilic acid mentioned before and further 2-aminobenzoic acid, 3-aminobenzoic acid, 4-aminobenzoic acid, 2-amino-5-sulfobenzoic acid, 2-amino-4-sulfobenzoic acid, etc. Such substitutions in the phenyl radicals with alkyl, alkoxy, carboxyl and sulfo groups or with halogen atoms are possible in the compounds of this invention.

In the following examples parts are given as parts by weight.

*Example I*

18.5 parts of cyanuric chloride are stirred with 100 parts ice and water. At 0° C. a condensation with a solution of 17.3 parts of the sodium salt of metanilic acid is carried out. After completion of the reaction the acid formed is neutralized by the dropwise addition of 53 parts of a 10% sodium carbonate solution. Then a solution of 18.8 parts of 4,4'-diaminodiphenylsulfide-2,2'-disulfonic acid in the form of its sodium salt is added. The temperature is slowly raised to 20° C. whereafter the acid formed is neutralized again. The reaction mixture is warmed up to 40–50° C. and then 9.3 parts of aniline are added. The temperature is raised to 90–100° C. and after heating during a few hours the acid formed is neutralized once more. The clear solution is cooled down and 10 parts of concentrated hydrochloric acid are added to adjust the pH to a value corresponding to the range of colour changing of the indicator Congo red. The condensation product precipitates in a readily filterable form. It is separated by filtering, stirred with an equivalent amount of sodium carbonate (5.3) or sodium hydroxide (4 parts), dried at 80–100° C. and then ground. When treating wool with this product a good reserve against dyeing with substantive dyes is obtained.

*Example II*

18.5 parts of cyanuric chloride are dissolved in 100 parts of acetone and poured out into about 200 parts of ice and water under stirring. A solution of 18.8 parts of the sodium salt of 4,4'-diaminodiphenylsulfide-2,2'-disulfonic acid are dropwise added at 0° C. to the resulting suspension under vigorous stirring. After completion of the reaction the acid formed is neutralized with 53 parts of a 10% sodium carbonate solution. Then a solution of 21 parts of diethanolamine is added slowly. The temperature is raised to 40° C. When the reaction has become neutral 53 parts of a 10% sodium carbonate solution are added and the temperature is raised to 80–100° C. whereby the acetone distills off. At this temperature again 53 parts of a 10% sodium carbonate solution are added and heating is continued until the reaction has been completed. The product is separated from the reaction mixture by acidifying or salting out with 10% of salt, filtered off and dried in a neutral state. The light-grey powder obtained has substantially the same properties as the product of Example I.

*Example III*

0.1 mole of cyanuric chloride are condensed first at 0° C. with 0.1 mole of sulfanilic acid, as described in the preceding examples, then at 40–45° C. with 0.1 mole of diethanolamine and finally at about 100° C. with 0.05 mole of 4,4'-diaminodiphenylsulfide-2,2'-disulfonic acid. The light-grey powder obtained by evaporation has substantially the same properties as the product of Example I.

*Example IV*

0.1 mole of cyanuric chloride is condensed first at 0° C. with 0.1 mole of metanilic acid, as described in the Examples I and II, then at 40° C. with 0.5 mole of 4,4'-diaminodiphenyldisulfide-2,2'-disulfonic acid and finally at 95–100° C. with 0.1 mole of aniline. Acidifying results is a readily filterable precipitate which is filtered off and dried with an equivalent amount of sodium carbonate. The resulting product has substantially the same properties as that of Example I.

Example V 0.1 mole of cyanuric chloride is condensed first at 0° C. with 0.1 mole of metanilic acid, as described in the preceding examples, then at 40° C. with 0.1 mole of monoethanolamine and finally at 100° C. with 0.05 mole of 4,4'-diaminodiphenylsulfide-2,2'-disulfonic acid. After being precipated by acidifying the product is filtered off and the resulting paste is dried with an equivalent amount of sodium carbonate. The light-grey powder has substantially the same properties as that of Example I.

Example VI 0.1 mole of cyanuric chloride is condensed in a manner known per se at 0° C. with 0.1 mole of sulfanilic acid, then at 40° C. with 0.05 mole of 4,4'-diaminodiphenylsulfiide-2,2'-disulfonic acid and finally at about 100° C. with 0.1 mole of monomethylamine. After completion of the reaction the product is precipitated by acidifying, filtered off and dried with an equivalent amount of sodium carbonate. The product has substantially the same properties as that of Example I.

Example VII 0.1 mole of cyanuric chloride is condensed at 0° C. with 0.05 mole of 4,4'-diaminodiphenylsulfide-2,2'-disulfonic acid in a manner known per se. Then the reaction product is condensed with 0.2 mole of morpholine. After precipitating by acidification, filtering and drying with an equivalent amount of sodium carbonate a light-grey powder is obtained which has substantially the same properties as the product of Example I.

Example VIII 0.1 mole of cyanuric chloride is condensed in a manner known per se with 0.1 mole of metanilic acid, then with 0.05 mole of 4,4'-diaminodiphenylsulfide 2,2'-disulfonic acid and finally with ammonia as the last component. After completion of the reaction the reaction product is dried by evaporation. The resulting product has substantially the same properties as that of Example I.

Example IX 0.1 mole of cyanuric chloride is condensed with 0.2 mole of metanilic acid and then with 0.05 mole of 4,4'-diaminodiphenylsulfide as described in Example I. The resulting product has substantially the same properties as that of Example I.

With reference to the general formula the groups A, A', B and B' in the compounds prepared as described in the examples are the following:

| Example | A and A' | B and B' |
|---|---|---|
| I | phenyl-SO₃Na with –N(H)– | phenyl with –N(H)– |
| II | –N(C₂H₄OH)(C₂H₄OH) | as A and A'. |
| III | as in I | as in II. |
| IV | as in I | as in I. |
| V | as in I | –NHC₂H₄OH |
| VI | NaO₃S–phenyl–N(H)– | –NHCH₃ |
| VII | morpholino (N with H₂C–CH₂–O–CH₂–CH₂) | as A and A'. |
| VIII | as in I | –NH₂ |
| IX | as in I | as A and A'. |

What I claim is:

1. Process of reserving natural proteins and synthetic polyamides against dyeing by substantive dyes which comprises applying thereto a reserving agent having the formula:

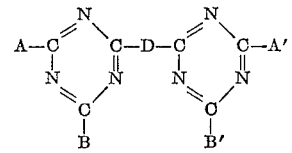

wherein A, A', B and B' are radicals selected from the group consisting of amino, alkylamino, alkylolamino, arylamino, and morpholino, bonded to the cyanuric radical at the amino nitrogen atom, and D is a diaminodiphenylsulfide radical bonded to the cyanuric radical at the amino nitrogen atoms.

2. The process of claim 1 in which D is the radical of 4,4'-diaminodiphenylmonosulfide-2,2'-disulfonic acid.

3. The process of claim 1 in which D is the radical of 4,4'-diaminodiphenyldisulfide-2,2'-disulfonic acid.

References Cited in the file of this patent

UNITED STATES PATENTS

| 1,922,993 | Torinus | Aug. 15, 1933 |
| 2,599,145 | Vogel | June 3, 1952 |
| 2,688,617 | Hein et al. | Sept. 7, 1954 |